(12) United States Patent
Wang et al.

(10) Patent No.: US 12,067,069 B2
(45) Date of Patent: Aug. 20, 2024

(54) URL REFRESHING METHOD, APPARATUS AND DEVICE IN CDN, AND CDN NODE

(71) Applicants: BEIJING KINGSOFT CLOUD NETWORK TECHNOLOGY CO., LTD., Beijing (CN); BEIJING KINGSOFT CLOUD TECHNOLOGY CO., LTD., Beijing (CN)

(72) Inventors: Yongqiang Wang, Beijing (CN); Yandong Nian, Beijing (CN)

(73) Assignees: BEIJING KINGSOFT CLOUD NETWORK TECHNOLOGY CO., LTD., Beijing (CN); BEIJING KINGSOFT CLOUD TECHNOLOGY CO., LTD., Beijing (CN)

( * ) Notice: Subject to any disclaimer, the term of this patent is extended or adjusted under 35 U.S.C. 154(b) by 162 days.

(21) Appl. No.: 17/778,102

(22) PCT Filed: Nov. 17, 2020

(86) PCT No.: PCT/CN2020/129230
§ 371 (c)(1),
(2) Date: May 19, 2022

(87) PCT Pub. No.: WO2021/104100
PCT Pub. Date: Jun. 3, 2021

(65) Prior Publication Data
US 2023/0022141 A1 Jan. 26, 2023

(30) Foreign Application Priority Data
Nov. 27, 2019 (CN) .......................... 201911197702.2

(51) Int. Cl.
*G06F 16/00* (2019.01)
*G06F 16/23* (2019.01)
(Continued)

(52) U.S. Cl.
CPC ........ *G06F 16/955* (2019.01); *G06F 16/2379* (2019.01); *G06F 16/958* (2019.01)

(58) Field of Classification Search
CPC .. G06F 16/955; G06F 16/2379; G06F 16/958; G06F 16/9574; G06F 16/23
See application file for complete search history.

(56) References Cited

U.S. PATENT DOCUMENTS 6,591,266 B1 * 7/2003 Li ....................... G06F 16/9574
707/999.009
8,996,664 B2 * 3/2015 Richardson ............. H04L 67/01
709/219

(Continued)

FOREIGN PATENT DOCUMENTS

CN 1996886 A 7/2007
CN 103678337 A 3/2014
(Continued)

OTHER PUBLICATIONS

Japanese Patent Office; Japanese Application No. 2022-551426; dated Apr. 20, 2023; 7 pages.
(Continued)

*Primary Examiner* — Noosha Arjomandi
(74) *Attorney, Agent, or Firm* — Faegre Drinker Biddle & Reath LLP

(57) ABSTRACT

A URL refreshing method, apparatus and device in a CDN, and a CDN node, relating to the technical field of data processing, and the technical problem of poor URL refreshing efficiency in a CDN. The method includes: receiving a first refreshing request, the first refreshing request compris-
(Continued)

ing at least one URL to be refreshed; comparing the at least one URL with a URL stored in a local database, the local database storing a URL corresponding to a locally stored source file; and executing a refreshing operation of the URL existing in the database.

12 Claims, 4 Drawing Sheets

(51) Int. Cl.
    *G06F 16/955*     (2019.01)
    *G06F 16/958*     (2019.01)

(56) References Cited

U.S. PATENT DOCUMENTS

| | | | | |
|---|---|---|---|---|
| 11,128,732 B1* | 9/2021 | Czerpak | ............ | G06F 16/9574 |
| 2001/0039658 A1* | 11/2001 | Walton | ............... | H04N 21/4312 |
| | | | | 725/51 |
| 2006/0080405 A1* | 4/2006 | Gibson | ............... | G06F 16/9562 |
| | | | | 709/218 |
| 2008/0228772 A1* | 9/2008 | Plamondon | ......... | G06F 16/9574 |
| 2011/0208850 A1* | 8/2011 | Sheleheda | ........... | G06F 16/9535 |
| | | | | 709/223 |
| 2014/0298445 A1 | 10/2014 | Jiang et al. | | |
| 2014/0379871 A1 | 12/2014 | Van Brandenburg et al. | | |
| 2015/0052584 A1* | 2/2015 | Rudraraju | ............. | H04L 63/102 |
| | | | | 726/4 |
| 2016/0110466 A1* | 4/2016 | Uzun | .................... | H04L 67/568 |
| | | | | 707/751 |
| 2022/0353081 A1* | 11/2022 | Duvdevani | ........... | G06F 16/955 |
| 2023/0022141 A1* | 1/2023 | Wang | .................. | G06F 16/9574 |

FOREIGN PATENT DOCUMENTS

| | | | | |
|---|---|---|---|---|
| CN | 106202112 A | | 12/2016 | |
| CN | 110020272 A | * | 7/2019 | ....... G06F 17/30887 |
| CN | 110020272 A | | 7/2019 | |
| CN | 112513830 A | * | 3/2021 | |
| JP | 2015510161 A | | 4/2015 | |

OTHER PUBLICATIONS

China National Intellectual Property Administration; International Search Report; International Application No. PCT/CN2020/129230; dated Feb. 20, 2021.

* cited by examiner

URL REFRESHING METHOD, APPARATUS AND DEVICE IN CDN, AND CDN NODE

The present application is a national stage of International Application No. PCT/CN2020/129230, filed on Nov. 17, 2020, which claims priority to Chinese Patent Application No. 201911197702.2, titled "URL REFRESHING METHOD, APPARATUS AND DEVICE IN CDN, AND CDN NODE", filed on Nov. 27, 2019 with the China National Intellectual Property Administration, both of which are incorporated herein by reference in their entireties.

FIELD

The present disclosure relates to the field of data processing technology, and in particular to a URL refreshing method, apparatus and device in a CDN and a CDN node.

BACKGROUND

A content delivery network (CDN) is an intelligent virtual network established based on a conventional network, which is capable of storing and delivering content of a uniform resource locator (URL).

In order to store the content of the URL, the conventional CDN server includes multiple memories. In practical applications, URLs stored in the memories are required to be refreshed frequently to ensure real-time and correctness of the URLs stored in the CDN.

In order to ensure that all to-be-refreshed URLs are deleted in the CDN refreshing process, each memory in the CDN is required to delete all to-be-refreshed URLs. Therefore, in the conventional URL refreshing method in the CDN, workload of each memory in the CDN is heavy, resulting in low URL refreshing efficiency in the CDN.

SUMMARY

An objective of the present disclosure is to provide a URL refreshing method, apparatus and device in a CDN and a CDN node to solve the technical problem of low URL refreshing efficiency in the CDN.

In a first aspect, a URL refreshing method in a CDN is provided according to an embodiment of the present disclosure. The method includes: receiving a first refresh request, where the first refresh request includes at least one to-be-refreshed URL; comparing the at least one to-be-refreshed URL with a URL stored in a local database, where the local database stores a URL corresponding to a locally stored source file; and performing a refresh operation on a to-be-refreshed URL stored in the database.

In a second aspect, another URL refreshing method in a CDN is provided. The method includes: receiving a second refresh request from a load balancing device, where the second refresh request includes at least one to-be-refreshed URL from the load balancing device; filtering the at least one to-be-refreshed URL from the load balancing device based on an identification stored in a local database, to obtain at least one filtered to-be-refreshed URL, where the local database is configured to record an identification of a source file stored in a storage device in a node including the load balancing device; and transmitting a first refresh request to the storage device in the node including the load balancing device, where the first refresh request includes the at least one filtered to-be-refreshed URL, and the storage device filters the at least one filtered to-be-refreshed URL and performs a refresh operation on the at least one filtered to-be-refreshed URL that is filtered again.

In a third aspect, a URL refreshing apparatus in a CDN is provided. The apparatus includes a receiving module, a comparing module, and a refreshing module. The receiving module is configured to receive a first refresh request, where the first refresh request includes at least one to-be-refreshed URL. The comparing module is configured to compare the at least one to-be-refreshed URL with a URL stored in a local database, where the local database stores a URL corresponding to a locally stored source file. The refreshing module is configured to perform a refresh operation on the to-be-refreshed URL stored in the database.

In a fourth aspect, a URL refreshing apparatus in a CDN is provided. The apparatus includes a receiving module, a filtering module and a transmitting module. The receiving module is configured to receive a second refresh request from a load balancing device, where the second refresh request includes at least one to-be-refreshed URL from the load balancing device. The filtering module is configured to filter the at least one to-be-refreshed URL from the load balancing device based on an identification stored in a local database to obtain at least one filtered to-be-refreshed URL, where the local database is configured to record an identification of source file stored in a storage device in a node including the load balancing device. The transmitting module is configured to transmit a first refresh request to the storage device in the node including the load balancing device, where the first refresh request includes the at least one filtered to-be-refreshed URL, and the storage device filters the at least one filtered to-be-refreshed URL and performs a refresh operation on the at least one filtered to-be-refreshed URL that is filtered again.

In a fifth aspect, a storage device is provided. The storage device includes a memory and a processor. The memory stores a computer program that is executable by the processor. The processor, when executing the computer program, performs the method described in the first aspect.

In a sixth aspect, an auxiliary device is provided. The auxiliary device includes a memory and a processor. The memory stores a computer program that is executable by the processor. The processor, when executing the computer program, performs the method described in the second aspect.

In a seventh aspect, a CDN node is provided. The CDN node includes a storage device. The storage device is configured to: receive a first refresh request, where the first refresh request includes at least one to-be-refreshed URL; compare the at least one to-be-refreshed URL with a URL stored in a local database, where the local database stores a URL corresponding to a locally stored source file; and perform a refresh operation on a to-be-refreshed URL stored in the database.

In order to make the objectives, the features and the advantages of the present disclosure obvious and understandable, preferred embodiments are enumerated below, and the embodiments are described in detail in conjunction with the drawings.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF EMBODIMENTS

Figure 1:
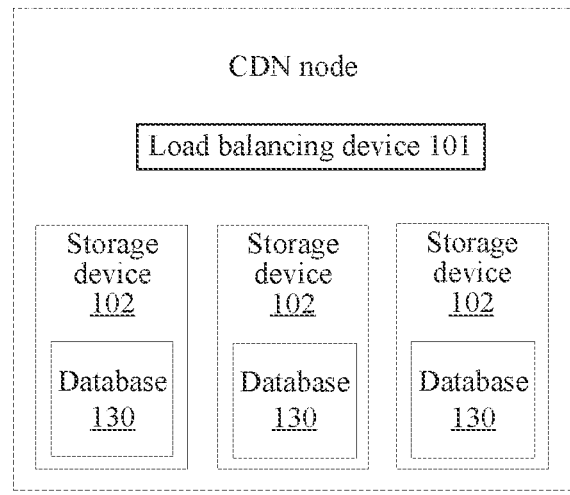
FIG. 1 is a schematic structural diagram of a CDN node according to an embodiment of the present disclosure.

In order to make the objectives, the technical solutions and the advantages of the embodiments of the present disclosure more clear, technical solutions of the embodiments of the present disclosure are clearly and completely described below in conjunction with the drawings. Apparently, the embodiments described below are only some embodiments of the present disclosure, rather than all the embodiments. Any other embodiments obtained by those skilled in the art based on the embodiments in the present disclosure without any creative effort fall within the protection scope of the present disclosure.

In the embodiments of the present disclosure, terms of "include", "comprise" or any other variants are intended to be non-exclusive. For example, a process, method, system, product or device including a series steps or units includes not only the enumerated steps or units but also other steps or units that are not enumerated, or also include the steps or units inherent for the process, method, system, product or device.

At present, the conventional URL refreshing methods in the CDN includes exact URL refreshing in the CDN, directory refreshing, and filtrating refreshing by performing a regular expression match on the URL. In the above refreshing methods, all URLs required to be refreshed are transmitted to each storage device (also known as CACHE device) in the CDN node. That is because it is required to ensure that dirty data is deleted in each CACHE device. A refresh request is transmitted to the CACHE or other memory of the CDN, and the CACHE or the memory of the CDN performs refresh.

The conventional CDN provides a service in a distributed cluster manner, that is, an architecture combining reverse proxy with CACHE storage rather than a stand-alone architecture. In a distributed cluster, by using consistent hash algorithm, real documents corresponding to one URL are stored in one CACHE device in the CDN cluster as far as possible. All reverse proxies in the CDN cluster forward the URL to a corresponding CACHE to store the URL in the CACHE. In this way, CAHE devices in the distributed cluster store different contents, maximizing the utilization efficiency of a storage space of the distributed cluster.

However, due to the structure of the distributed storage, the number of CACHE devices in the CDN cluster may be increased or decreased, the same data may be stored in multiple CACHE devices. Thus, the URLs cannot be completely refreshed by using the consistent hash algorithm. The refresh operation is required to ensure that the file is deleted. Therefore, in order to ensure security, in the conventional logic, all to-be-refreshed URLs are deleted in all CACHE devices. However, in practical applications, the number of to-be-refreshed URLs stored in each CACHE device is much less than the number of all URLs, resulting in a large number of invalid refreshes. In addition, a large task load results in low refresh efficiency. Therefore, heavy invalid refresh task results in low refresh efficiency. Moreover, the CACHE device processes many invalid requests, resulting in heavy workload.

In order to solve the above problems, a URL refreshing method in a CDN is provided according to an embodiment of the present disclosure. With the method, the refresh operation is performed on a URL actually stored in the memory, which reduces invalid refresh of the URL in the memory and reduces workload of the memory in the CDN, thereby improving efficiency of URL refresh in the CDN.

FIG. 1 is a schematic structural diagram of a CDN node according to an embodiment of the present disclosure. As shown in FIG. 1, the CDN node includes a load balancing device 101 and a storage device 102.

The storage device 102 is configured to receive a first refresh request, where the first refresh request includes at least one to-be-refreshed URL; compare the at least one to-be-refreshed URL with a URL stored in a local database, where the local database stores a URL corresponding to a locally stored source file; and perform a refresh operation on a to-be-refreshed URL stored in the database.

The load balancing device 101 is configured to transmit the first refresh request to the storage device 102.

For example, as shown in FIG. 1, the storage device 102 in an embodiment of the present disclosure may be a CACHE device. For the CACHE (cache memory) device, when analyzing a URL visited for the first time, the CACHE device acquires a source file from a source station. In addition, if a source file does not exist locally when the CACHE device analyzes a visited URL, the CACHE device acquires the source file from a parent CDN node or the source station. When the CACHE device acquires the source file from the source station, a log is recorded locally. The log is referred to as a back-to-source log and the back-to-source log records back-to-source information.

In an embodiment of the present disclosure, as shown in FIG. 1, a back-to-source log for each CACHE device is recorded. The back-to-source log may be recorded in a database 130. The database 130 sinks to a CACHE device in the CDN node. In each CACHE device, back-to-source information of this CACHE device is recorded, which reduces leakage, improves real-time performance and improves correctness of URL data record.

The database 130 may also be referred to as a first record table. In practical applications, the database may be established in each CACHE device. The database is configured to store a URL list that is acquired by the CACHE device. That is, a URL is stored in a database of a CACHE device that performs back-to-source on the URL. As an example, each time the CACHE device performs back-to-source, a backto-source log is printed and the stored in the database. The back-to-source log stored in the database may be deduplicated based on a URL.

In an embodiment of the present disclosure, the database responsible for recording the back-to-source log sinks to each CACHE device of the CDN node, instead of being arranged in a log collection device of the CDN node simply. By establishing a database in each CACHE device, the back-to-source log stored in the database is permanently stored and the back-to-source log stored locally can be directly queried, which improves efficiency of querying a URL.

Figure 2:
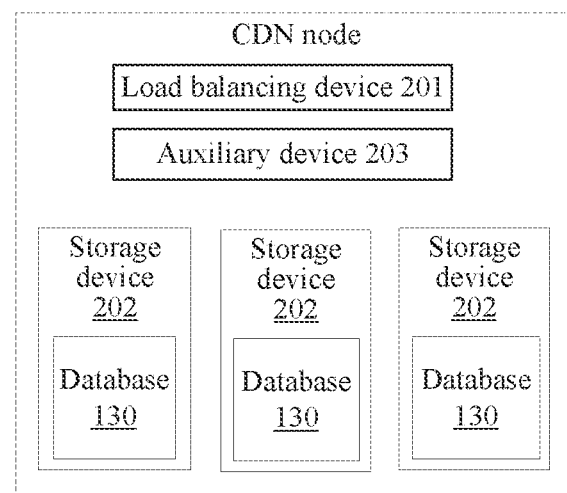
FIG. 2 is a schematic structural diagram of a CDN node according to another embodiment of the present disclosure.

FIG. 2 is a schematic structural diagram of a CDN node according to another embodiment of the present disclosure. As shown in FIG. 2, the CDN node may include a load balancing device 201, a storage device 202 and an auxiliary device 203.

The storage device 202 is configured to receive a first refresh request, where the first refresh request includes at least one to-be-refreshed URL; compare the at least one to-be-refreshed URL with a URL stored in a local database, where the local database stores a URL corresponding to a locally stored source file; and perform a refresh operation on a to-be-refreshed URL stored in the database.

The load balancing device 201 is configured to transmit a second refresh request to the auxiliary device 203.

The auxiliary device 203 is configured to receive the second refresh request from the load balancing device 201, where the second refresh request includes at least one to-be-refreshed URL from the load balancing device 201; filter the at least one to-be-refreshed URL from the load balancing device 201 based on an identification stored in the local database, to obtain at least one filtered to-be-refreshed URL, where the local database is configured to record an identification of a source file stored in the storage device of the node including the load balancing device, and transmit the first refresh request to the storage device of the node including the load balancing device, where the first refresh request includes the at least one filtered to-be-refreshed URL.

Since the database sinks to the storage device 202 of the CDN node, querying the database consumes computing resources of the storage device. A main task of the storage device 202 is to serve customers, so that the computing resources of the storage device are precious. In order to reduce computing resources consumed by querying the database, double filtration performed by the auxiliary device 203 and the storage device 202 may be configured. The auxiliary device 203 may be a log collection and processing device. The back-to-source log of each storage device 202 may be reported to the auxiliary device 203 of the node including the storage device. Multiple auxiliary devices 203 may be arranged in one node, to ensure stability. Although the auxiliary device 203 collects logs with a delay compared with the storage devices 202, most of refresh filtering can be performed.

Figure 3:
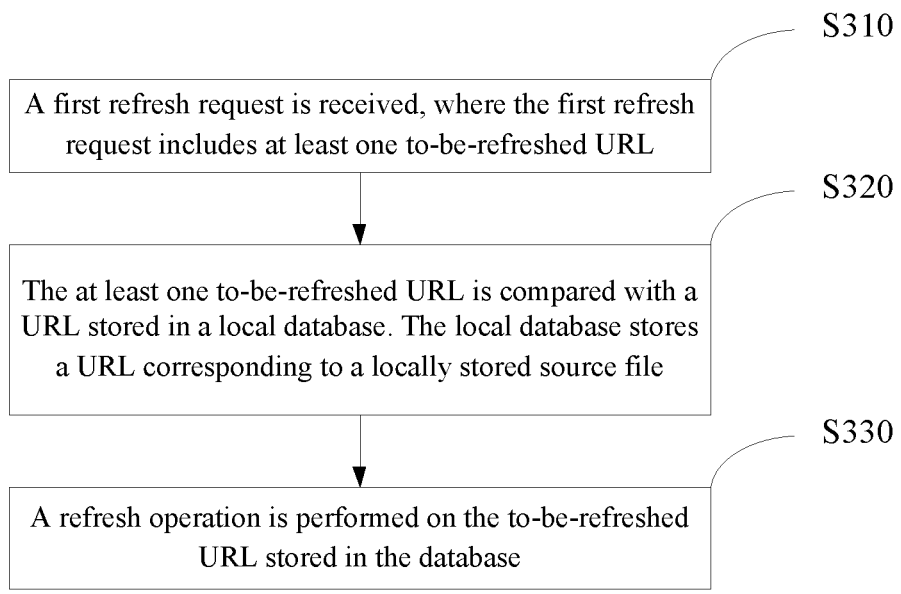
FIG. 3 is a flowchart of a URL refreshing method in a CDN according to an embodiment of the present disclosure.

FIG. 3 is a flowchart of a URL refreshing method in a CDN according to an embodiment of the present disclosure. The method may be applied to a memory in a CDN node. As shown in FIG. 3, the method includes steps S310 to S330.

In step S310, a first refresh request is received, where the first refresh request includes at least one to-be-refreshed URL.

The CDN mainly depends on edge servers deployed in various places to make users acquire required content nearby, by functional modules including a load balancing module, a content delivery module, and a scheduling module of a central platform. In this way, reduces network congestion is reduced, and the response speed and the hit rate of user access are improved. The CDN node applicable to an embodiment of the present disclosure may be as shown in FIG. 1 or FIG. 2.

As an example, after receiving the first to-be-refreshed URL, the load balancing device in the CDN may directly transmit the first to-be-refreshed URL to all storage devices in the node.

As another example, after receiving the second to-be-refreshed URL, the load balancing device in the CDN may transmit the second to-be-refreshed URL to the auxiliary device in the node including the load balancing device. The auxiliary device filters the second to-be-refreshed URL to obtain a first to-be-refreshed URL and then transmit the first to-be-refreshed URL to all storage devices in the node including the load balancing device.

In step S320, the at least one to-be-refreshed URL is compared with a URL stored in a local database. The local database stores a URL corresponding to a locally stored source file.

In an embodiment, the URL stored in the local database is used for recording the URL corresponding to the source file stored in the storage device. Usually, after the back-to-source, the storage device records the source file locally, so that it is not required to acquire the source file from the source station for a next request. The URL stored in the local database may be in a form of a record table or a database. Through the URL stored in the local database, the URL that is not stored in local is filtered out.

In some embodiments, the URL stored in the local database may be determined, based on the local back-to-source log including the back-to-source URL. The back-to-source log may be understood with reference to the description in the embodiment shown in FIG. 1, which will not be repeated herein.

In step S330, a refresh operation is performed on the to-be-refreshed URL stored in the database.

In this step, the refresh operation is performed on contents which correspond to the to-be-refreshed URL and are locally stored in the storage device. For example, the to-be-refreshed URL and the source file corresponding to the to-be-refreshed URL are deleted.

In an embodiment of the present disclosure, the at least one to-be-refreshed URL is filtered based on the URLs stored in the database of the storage device, and the refresh operation is only performed on the URL actually stored in the storage device. In this way, invalid refresh URL and the workload of the storage device are reduced, and an efficiency of performing URL refresh in the CDN is greatly improved, thereby improving the overall efficiency of the URL refresh in the CDN.

In practical applications, the refreshing efficiency of the URL refreshing method in the CDN according to the embodiments of the present disclosure is proportional to the number of memories in the CDN node. For example, the refresh needs to be performed on m URLs, and one CDN node includes n storage devices such as n cache (CACHE) devices. Each of the n storage devices only perform m/n URL refreshes. If one piece of URL is only stored in one storage device, only m refresh operations are required. Therefore, for the CDN node or the CDN network, the efficiency of the URL refresh is greatly improved. Under the premise of ensuring that all URL data to be refreshed are refreshed without affecting the overall URL refreshing process in the CDN, the number of refresh operations performed by each storage device is reduced and the workload of each storage device is reduced.

In some embodiments, the above step S330 may be implemented by the following steps 1) and 2).

In step 1), a URL that does not exist in the database is deleted from the at least one to-be-refreshed URL, to obtain at least one to-be-refreshed URL that exists in the database.

In step 2), the refresh operation is performed on the at least one to-be-refreshed URL that exists in the database.

For each CACHE device, the URL that is not stored locally is deleted by filtering URLs stored in the local database, and the rest is the URL stored locally and required to be refreshed. With the method, the URL that is actually required to be refreshed in the storage device is determined quickly and accurately.

In some embodiments, the first refresh request is from the auxiliary device, and the at least one to-be-refreshed URL from the auxiliary device is obtained by the auxiliary device filtering at least one to-be-refreshed URL from the load balancing device.

As an example, the load balancing device may first transmit the first refresh request to the auxiliary device. The auxiliary device filters the first refresh request and then transmits the filtered first refresh request to the storage device.

Apparently, in an embodiment of the present disclosure, the load balancing device may filter the first refresh request, and then directly transmit the filtered first refresh request to the storage device.

In the embodiments of the present disclosure, before the memory receives the first refresh request, the auxiliary device or the load balancing device first filters the to-be-refreshed URL in the first refresh request. After the memory receives the first refresh request after the first filtering, the memory performs a second filter on the to-be-refreshed URL in the first refresh request after the first filtering, based on the URL stored in the local database. By filtering the to-be-refreshed URL for two times, the effect of double filtering of the to-be-refreshed URL is realized.

Figure 4:
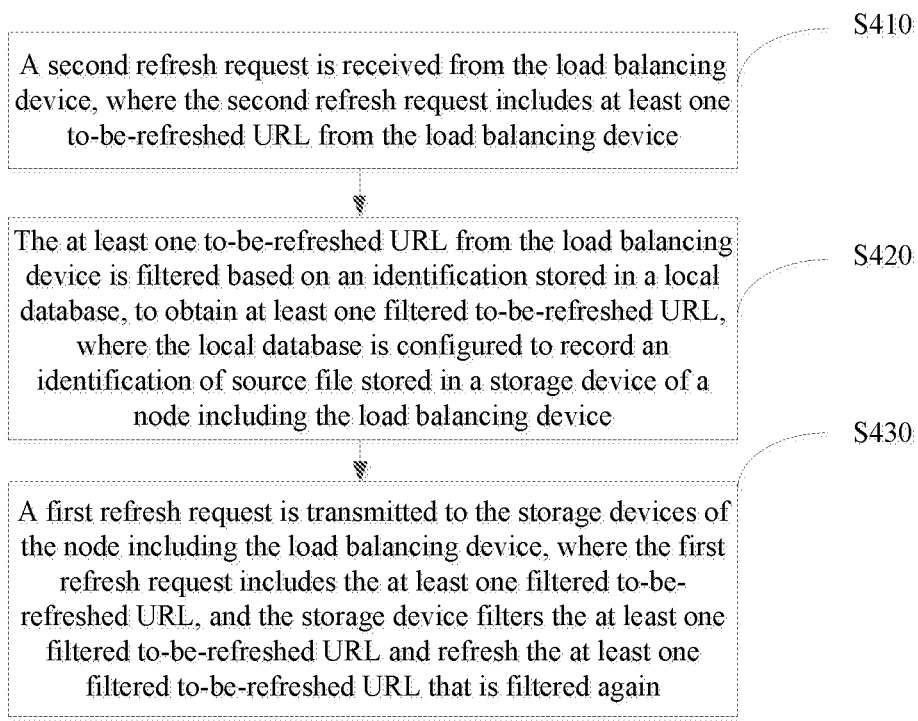
FIG. 4 is a flowchart of a URL refreshing method in a CDN according to another embodiment of the present disclosure.

FIG. 4 is a flowchart of a URL refreshing method in a CDN according to another embodiment of the present disclosure. The method may be applied to a memory in the CDN node. As shown in FIG. 3, the method includes the following steps S410 to S430.

In S410, a second refresh request is received from the load balancing device. The second refresh request includes at least one to-be-refreshed URL from the load balancing device.

In S420, the at least one to-be-refreshed URL from the load balancing device is filtered based on an identification stored in a local database, to obtain at least one filtered to-be-refreshed URL. The local database is configured to record an identification of source file stored in a storage device of a node including the load balancing device.

In S430, a first refresh request is transmitted to the storage devices in the node including the load balancing device, where the first refresh request includes the at least one filtered to-be-refreshed URL, and the storage device filters the at least one filtered to-be-refreshed URL and refresh the at least one filtered to-be-refreshed URL that is filtered again.

By the solution according to the embodiments of the present disclosure, the influence of the storage device can be reduced.

In some embodiments, the CDN serves a large number of customers, so that the CDN services a large number of domain names. Each CDN node serves domain names within a region rather than serve all customers. Thus, the auxiliary device in the CDN node may perform the filtering based on the served domain names to filter out a domain name that is not served by the CDN node. Based on the above, the identification of the source file may be a domain name, and the method may further include the following steps a) and b).

In step a), a back-to-source log is received from the storage device in the node including the load balancing device. The back-to-source log includes a back-to-source URL.

In step b), storage of the local database is determined based on a domain name in the back-to-source URL.

It should be noted that the URL includes: a protocol, a domain name, a path and a parameter. For example, the URL is: https://www.baidu.com/a/b/c11.txt?tn=48021271_15_hao_pg.

In the URL, "https" represents the protocol, "www.baidu.com" represents the domain name, "/a/b/c11.txt" represents the parameter.

Figure 5:
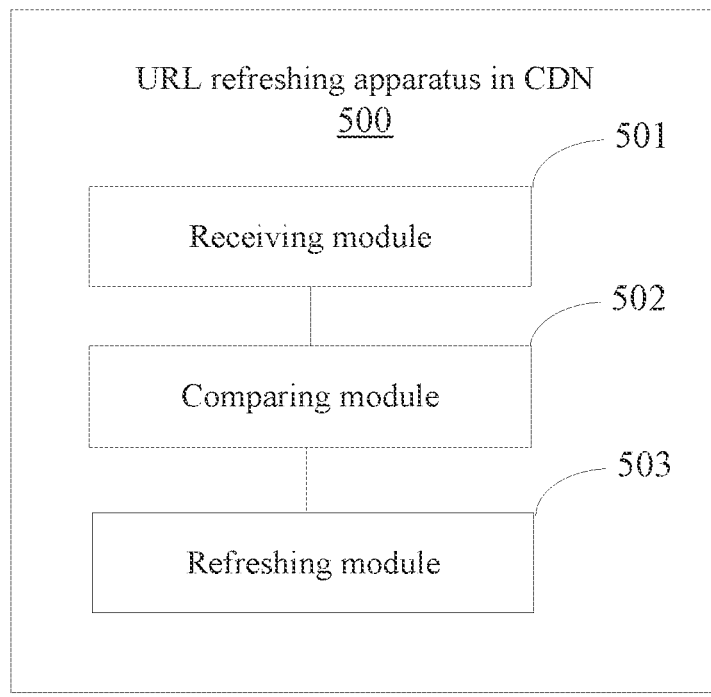
FIG. 5 is a schematic structural diagram of a URL refreshing apparatus in a CDN according to an embodiment of the present disclosure.

FIG. 5 is a schematic structural diagram of a URL refreshing apparatus in a CDN according to an embodiment of the present disclosure. As shown in FIG. 5, the URL refreshing apparatus 500 in the CDN includes a receiving module 501, a comparing module 502 and a refreshing module 503.

The receiving module 501 is configured to receive a first refresh request, where the first refresh request includes at least one to-be-refreshed URL.

The comparing module 502 is configured to compare the at least one to-be-refreshed URL with a URL stored in a local database. The local database stores a URL corresponding to a locally stored source file.

The refreshing module 503 is configured to perform a refresh operation on the to-be-refreshed URL stored in the database.

In some embodiments, the URL stored in the database is determined based on a local back-to-source log. The back-to-source log includes a back-to-source URL.

In some embodiments, the refreshing module 503 is specifically configured to:
  delete a URL that does not exist in the database from the at least one to-be-refreshed URL, to obtain at least one to-be-refreshed URL that exists in the database; and
  perform a refresh operation on the at least one to-be-refreshed URL that exists in the database.

The URL refreshing apparatus in the CDN according to the embodiments of the present disclosure has the same technical features as the URL refreshing method in the CDN according to the embodiment shown in FIG. 3, so that the URL refreshing apparatus solves the same technical problems and achieves the same technical effect as the URL refreshing method.

Figure 6:
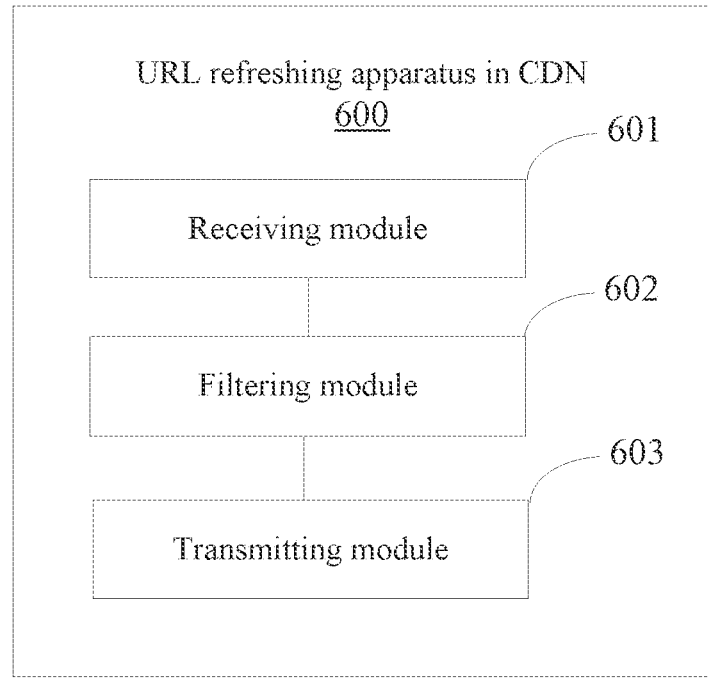
FIG. 6 is a schematic structural diagram of a URL refreshing apparatus in a CDN according to another embodiment of the present disclosure.

FIG. 6 is a schematic structural diagram of a URL refreshing apparatus in a CDN according to another embodiment of the present disclosure. As shown in FIG. 6, the URL refreshing apparatus 600 in the CDN includes a receiving module 601, a filtering module 602 and a transmitting module 603.

The receiving module 601 is configured to receive a second refresh request from a load balancing device. The second refresh request includes at least one to-be-refreshed URL from the load balancing device.

The filtering module 602 is configured to filter the at least one to-be-refreshed URL from the load balancing device based on an identification stored in a local database to obtain at least one filtered to-be-refreshed URL. The local database is configured to record an identification of a source file stored in a storage device in a node including the load balancing device.

The transmitting module 603 is configured to transmit a first refresh request to the storage device in the node including the load balancing device, where the first refresh request includes the at least one filtered to-be-refreshed URL, and the storage device filters the at least one filtered to-be-refreshed URL and perform a refresh operation on the at least one filtered to-be-refreshed URL that is filtered again.

In some embodiments, the identification of the source file is a domain name and the apparatus 600 further includes a determining module.

The receiving module 601 is further configured to receive a back-to-source log transmitted by the storage device in the node including the load balancing device. The back-to-source log includes a back-to-source URL.

The determining module is configured to determine storage of a local database based on a domain name in the back-to-source URL.

The URL refreshing apparatus in the CDN according to the embodiments of the present disclosure has the same technical features as the URL refreshing method in the CDN according to the embodiment shown in FIG. 4, so that the URL refreshing apparatus solves the same technical problems and achieves the same technical effect as the URL refreshing method.

Figure 7:
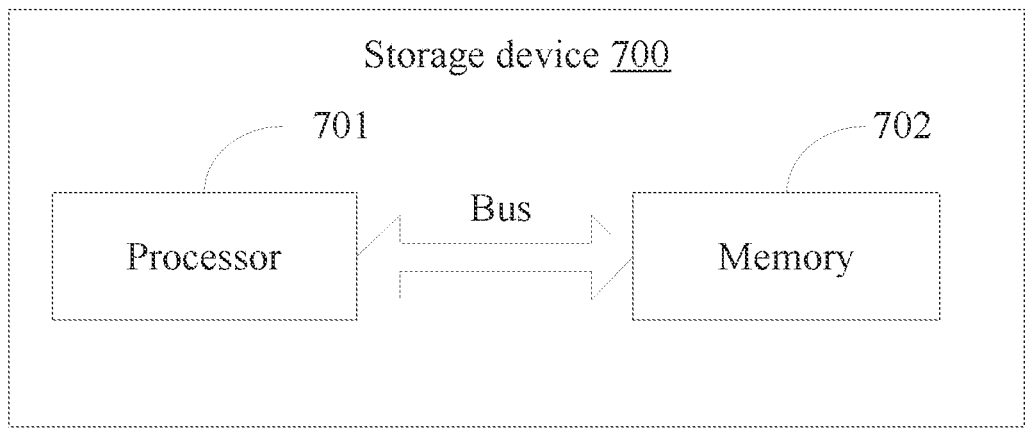
FIG. 7 is a schematic structural diagram of a storage device according to an embodiment of the present disclosure.

As shown in FIG. 7, a storage device 700 is provided according to an embodiment of the present disclosure. The storage device 700 includes a processor 701, a memory 702, and a bus. The memory 702 stores machine-readable instructions executable by the processor 701. When the electronic device is running, the processor 701 communicates with the memory 702 through the bus, and the processor 701 executes the machine-readable instructions to perform the URL refreshing method in the CDN described above.

The memory 702 and the processor 701 may be a general memory and a general processor respectively, which is not limited herein. The processor 701, when executing the computer program stored in the memory 702, performs the URL refreshing method in the CDN described above.

Figure 8:
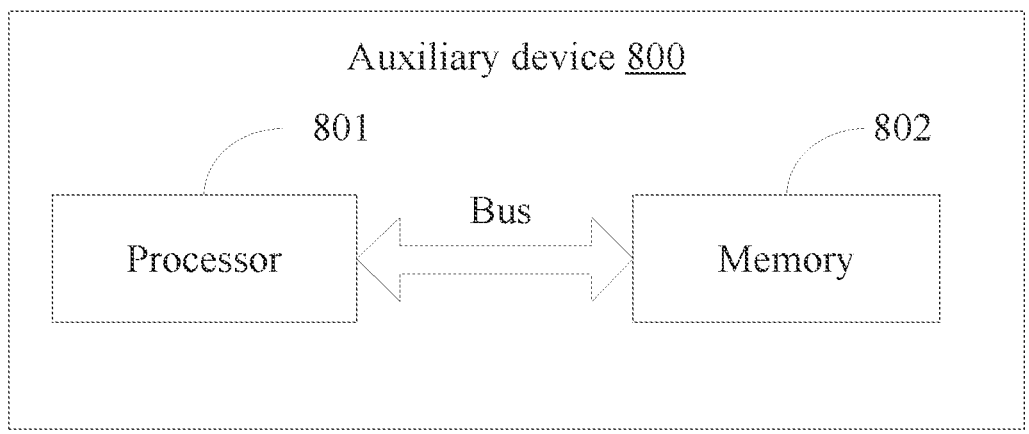
FIG. 8 is a schematic structural diagram of an auxiliary device according to an embodiment of the present disclosure.

As shown in FIG. 8, an auxiliary device 800 is provided according to an embodiment of the present disclosure. The auxiliary device 800 includes a processor 801, a memory 802, and a bus. The memory 802 stores machine-readable instructions executable by the processor 801. When the electronic device is running, the processor 801 communicates with the memory 802 through the bus, and the processor 801 executes the machine-readable instructions to perform the URL refreshing method in the CDN described above.

The memory 802 and the processor 801 may be a general memory and a general processor respectively, which is not limited herein. The processor 801, when executing the computer program stored in the memory 802, performs the URL refreshing method in the CDN described above.

For example, the storage device or auxiliary device may further include a communication interface, a processor, a communication interface and a memory that are connected through the bus. The processor is configured to execute an executable module such as a computer program stored in the memory.

The memory may include a high-speed random access memory (RAM) or a non-volatile memory, for example, at least one disk memory. The network element of the system communicates with at least one other network element through at least one communication interface (which may be wired or wireless). The Internet, wide area network, local network, metropolitan area network and the like may be used.

The bus may be an ISA bus, PCI bus, EISA bus or the like. The bus may be divided into an address bus, a data bus, a control bus and the like. For ease of representation, in FIGS. 7 and 8, the bus is represented by a two-way arrow. However, it does not mean that there is only one bus or one type of bus.

The memory is configured to store a program. The processor executes the program after receiving an execution instruction. The method performed by the apparatus defined in the process disclosed in any embodiment of the present disclosure may be applied to the processor or implemented by the processor.

The processor may be an integrated circuit chip with the ability of processing a signal. In the process of implementation, each step of the above method may be performed through an integrated logic circuit of hardware or an instruction in a form of software in the processor. The processor may be a general processor such as a central processing unit (CPU) and a network processor (NP). The processor may also be a digital signal processing (DSP), an application specific integrated circuit (ASIC), a field-programmable gate array (FPGA) or other programmable logic devices, a discrete gate or transistor logic device, or a discrete hardware component. The processor is capable of realizing or executing the methods, steps and logic block diagrams disclosed in the embodiments of the present disclosure. The general processor may be a microprocessor or any conventional processor and the like. The steps of the method disclosed in the embodiments of the present disclosure may be directly performed by a hardware decoding processor or by a combination of a hardware module and a software module in a decoding processor. The software module may be in a mature storage medium in this field such as a random access memory, a flash memory, a read-only memory, a programmable read-only memory or an electrically erasable programmable memory, and a register. The storage medium is in a memory, and the processor reads information in the memory and performs the method in combination with hardware of the processor.

Corresponding to the URL refreshing method in the CDN, a computer-readable storage medium is further provided according to an embodiment of the present disclosure. The computer-readable storage medium stores machine-executable instructions that when being called and executed by a processor, causes the processor to perform the URL refreshing method in the CDN described above.

The URL refreshing apparatus in a CDN according to the embodiments of the present disclosure may be specific hardware on a device, or software, firmware and the like installed on the device. The apparatus according to the embodiments of the present disclosure has the same principle and technical effects as the method. For a brief description, for details not mentioned in the apparatus embodiment, one may refer to the content in the aforementioned method embodiment. Those skilled in the art can clearly understand that, for the convenience and conciseness of the description, for the operation processes of the system, the apparatus and the units described above, one may refer to the processes in the above method embodiments, and the processes are not repeated herein.

In the embodiments of the present disclosure, it should be understood that the disclosed apparatus and method may be realized in other forms. The apparatus embodiments described above are only schematic. For example, the units are divided based on logical function, and the units may be divided in other manners in actual implementation. For example, multiple units or components can be combined or integrated into another system, or some features may be ignored or not performed. In addition, the mutual coupling or direct coupling or communication connection shown or discussed may be indirect coupling or communication connection through some communication interfaces, apparatuses or units, which may be electrical, mechanical or other form.

Units described as separate components may be or may not be physically separated. Components shown as units may be or may not be physical units, that is, may be located in one location or may be distributed in multiple network units. Parts or all of the units may be selected based on actual conditions, to implement the technical solutions of the present disclosure.

In addition, functional units in the embodiments of the present disclosure may be integrated in one processing unit. Alternatively, the functional units may exist physically separately. Alternatively, two or more of the functional units may be integrated in one unit.

If the functions are implemented in a form of a software functional unit and sold or used as an independent product, the functions may be stored in a computer-readable storage medium. Based on this understanding, the essence of the technical solutions of the present disclosure, in other words, a part of the technical solutions that makes a contribution to the conventional technology or a part of the technical solutions may be embodied in a form of a software product. The computer software product is stored in a storage medium which includes several instructions used to cause a computer device (which may be a personal computer, a server, a network device or the like) to implement all or a part of steps of the URL refreshing method in the CDN described in the embodiments of the present disclosure. The storage medium described above includes various media which can store program code, such as a USB flash disk, a mobile hard disk, a read-only memory (ROM), a random access memory (RAM), a disk, or an optical disc.

It should be noted that similar labels and letters represent similar items in the drawings, so that once an item is defined in a diagram, the item is not required to be defined and explained in subsequent diagrams. In addition, the terms "first", "second" and "third" are used only to distinguish descriptions and cannot be understood to indicate or imply relative importance.

In the embodiments of the present disclosure, it should be understood that the disclosed apparatus and method may also be implemented in other ways. The apparatus embodiments described above are only schematic. For example, the flowcharts and block diagrams in the drawings show architectures, functions, and operations that may be realized by the apparatus, the method, and the computer program product according to the multiple embodiments of the present disclosure. Each block in a flowchart or a block diagram may represent a module, a program segment, or a part of code. The module, the program segment, or the part of code includes one or more executable instructions for implementing a specified logical function. It should also be noted that in some alternative implementations, functions shown in the blocks may also be realized in an order different from the order shown in the drawings. For example, two functions respectively shown in two consecutive blocks may actually be implemented basically simultaneously and the two functions may sometimes be implemented in an opposite order, which depends on the involved function. It should also be noted that each block in the block diagram and/or flowchart, and a combination of blocks in the block diagram and/or flowchart may be implemented by a dedicated hardware-based system for performing a specified function or action, or implemented by a combination of dedicated hardware and computer instructions.

It should be noted that the embodiments described above are only implementation of the present disclosure, which are used for describing the technical solutions of the present disclosure rather than limiting the present disclosure. The protection scope of the present disclosure is not limited to embodiments described above. Although the present disclosure is described in detail with reference to the embodiments, those skilled in the art should understand that any technical personnel familiar with the technical field can make variations and modifications to the technical solutions disclosed in the embodiments or make equivalent substitutions to part of technical features within the technical scope disclosed in the present disclosure equivalent. The modifications, variations or substitutions do not cause the nature of the technical solutions to depart from the scope of the technical solutions according to the embodiments of the present disclosure. The modifications, variations or substitutions should be within the protection scope of the present disclosure. Therefore, the protection scope of the present disclosure should be limited by the protection scope of the claims.

INDUSTRIAL PRACTICABILITY

With the URL refreshing method and apparatus in the CDN, and electronic device according to the embodiments of the present disclosure, at least one to-be-refreshed URL is filtered using a URL stored in a database in a storage device, so that the refresh operation is performed on only the URL actually stored in the storage device, which reduces invalid URL refreshing and workload of the storage device, and greatly improves efficiency of performing URL refresh in the CDN, thereby improving the overall efficiency of the URL refresh in the CDN.

The invention claimed is:

1. A uniform resource locator (URL) refreshing method in a content delivery network (CDN), comprising:
  receiving, by a storage device of a CDN node, a first refresh request from a load balancing device of the CDN node, wherein the first refresh request comprises at least one to-be-refreshed URL from the load balancing device;
  comparing, by the storage device of the CDN node, the at least one to-be-refreshed URL with a URL stored in a local database, wherein the local database stores a URL corresponding to a locally stored source file in the storage device; and
  performing, by the storage device of the CDN node, a refresh operation on a to-be-refreshed URL stored in the database; wherein the performing a refresh operation on a to-be-refreshed URL stored in the database comprises:
  deleting, by the storage device of the CDN node, from the at least one to-be-refreshed URL, a URL that does not exist in the database, to obtain at least one to-be-refreshed URL that exists in the database; and
  performing, by the storage device of the CDN node, the refresh operation on the at least one to-be-refreshed URL that exists in the database.

2. The method according to claim 1, wherein the URL stored in the database is determined based on a local back-to-source log, wherein the local back-to-source log comprises a back-to-source URL.

3. The method according to claim 1, wherein the first refresh request is from an auxiliary device, and at least one to-be-refreshed URL from the auxiliary device is obtained by the auxiliary device filtering at least one to-be-refreshed URL from a load balancing device.

4. A uniform resource locator (URL) refreshing method in a content delivery network (CDN), comprising:
   receiving a second refresh request from a load balancing device, wherein the second refresh request comprises at least one to-be-refreshed URL from the load balancing device;
   filtering the at least one to-be-refreshed URL from the load balancing device based on an identification stored in a local database, to obtain at least one filtered to-be-refreshed URL, wherein the local database is configured to record an identification of a source file stored in a storage device of a node including the load balancing device; and
   transmitting a first refresh request to the storage device of the node including the load balancing device, wherein the first refresh request comprises the at least one filtered to-be-refreshed URL, and the storage device filters the at least one filtered to-be-refreshed URL and performs a refresh operation on the at least one filtered to-be-refreshed URL that is filtered again.

5. The method according to claim 4, wherein the identification of the source file is a domain name and the method further comprises:
   receiving a back-to-source log transmitted by the storage device of the node including the load balancing device, wherein the back-to-source log comprises a back-to-source URL; and
   determining storage of the local database based on the domain name in the back-to-source URL.

6. A storage device, comprising a memory and a processor, wherein
   the memory stores a computer program that is executable by the processor; and
   the processor, when executing the computer program, performs the method according to claim 1.

7. An auxiliary device, comprising a memory and a processor, wherein
   the memory stores a computer program that is executable by the processor; and
   the processor, when executing the computer program, performs the method according to claim 4.

8. A content delivery network (CDN) node, comprising:
   a storage device configured to receive a first refresh request from a load balancing device of the CDN node, wherein the first refresh request comprises at least one to-be-refreshed uniform resource locator (URL) from the load balancing device; compare the at least one to-be-refreshed URL with a URL stored in a local database, wherein the local database stores a URL corresponding to a locally stored source file in the storage device; and perform a refresh operation on a to-be-refreshed URL stored in the database;
   wherein the storage device is further configured to:
      delete, from the at least one to-be-refreshed URL, a URL that does not exist in the database, to obtain at least one to-be-refreshed URL that exists in the database; and
      perform the refresh operation on the at least one to-be-refreshed URL that exists in the database.

9. The CDN node according to claim 8, further comprising:
   the load balancing device configured to transmit the first refresh request to the storage device.

10. The CDN node according to claim 8, further comprising an auxiliary device configured to:
    receive a second refresh request from the load balancing device, wherein the second refresh request comprises at least one to-be-refreshed URL from the load balancing device;
    filter the at least one to-be-refreshed URL from the load balancing device based on an identification stored in a local database, to obtain at least one filtered to-be-refreshed URL, wherein the local database is configured to record an identification of a source file stored in storage devices of the node; and
    transmit the first refresh request to the storage device of the node, wherein the first refresh request comprises the at least one filtered to-be-refreshed URL.

11. A non-transitory computer-readable storage medium, wherein the computer readable storage medium stores machine-executable instructions that, when being called and executed by the processor, causes the processor to perform the method according to claim 1.

12. A non-transitory computer-readable storage medium, wherein the computer readable storage medium stores machine-executable instructions that, when being called and executed by the processor, causes the processor to perform the method according to claim 4.

* * * * *